(12) United States Patent
Fujiwara

(10) Patent No.: US 9,438,758 B2
(45) Date of Patent: Sep. 6, 2016

(54) IMAGE FORMING APPARATUS

(71) Applicant: KYOCERA Document Solutions Inc., Osaka (JP)

(72) Inventor: Yoshiyuki Fujiwara, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/852,710

(22) Filed: Sep. 14, 2015

(65) Prior Publication Data

US 2016/0083216 A1 Mar. 24, 2016

(30) Foreign Application Priority Data

Sep. 18, 2014 (JP) ................. 2014-190073

(51) Int. Cl.
| | |
|---|---|
| G03G 15/00 | (2006.01) |
| H04N 1/00 | (2006.01) |
| B65H 1/04 | (2006.01) |
| B65H 1/28 | (2006.01) |
| B65H 7/20 | (2006.01) |
| B65H 37/00 | (2006.01) |
| B65H 43/00 | (2006.01) |
| B65H 85/00 | (2006.01) |

(52) U.S. Cl.
CPC ............ *H04N 1/00663* (2013.01); *B65H 1/04* (2013.01); *B65H 1/28* (2013.01); *B65H 7/20* (2013.01); *B65H 37/00* (2013.01); *B65H 43/00* (2013.01); *B65H 85/00* (2013.01); *G03G 15/6552* (2013.01); *H04N 1/00482* (2013.01); *H04N 1/00575* (2013.01); *B65H 2301/132* (2013.01); *B65H 2407/21* (2013.01); *B65H 2801/06* (2013.01)

(58) Field of Classification Search
CPC .. G03G 15/23; G03G 15/231; G03G 15/234; G03G 15/65; G03G 15/6502; G03G 15/6508; G03G 15/6555; G03G 2215/00556; G03G 2215/00586; H04N 1/00663
See application file for complete search history.

(56) References Cited

U.S. PATENT DOCUMENTS 6,785,487 B2 * 8/2004 Maeda ................. G03G 15/502
399/81

(Continued)

FOREIGN PATENT DOCUMENTS

| JP | 2005-191873 | 7/2005 |
|---|---|---|
| JP | 2009109763 A * | 5/2009 |

(Continued)

*Primary Examiner* — Ryan Walsh
(74) *Attorney, Agent, or Firm* — Wenderoth, Lind & Ponack, L.L.P.

(57) ABSTRACT

When the reception section has received a duplex printing instruction, the operation control section controls an sheet feeding unit to feed one sheet, and controls an image forming unit to form an image of a first page on one side of the sheet, and controls the sheet conveying unit to discharge the sheet. When the reception section has received an instruction indicating that the discharged sheet is an unused sheet with the formed image, the operation control section controls the sheet feeding unit to feed one sheet set in a manual feed tray, and controls the image forming unit to form an image of a second page on the other side of the sheet. The operation control section controls the feeding unit to feed a sheet, and controls the image forming unit to form images of a third page and subsequent pages on both sides of the sheet.

6 Claims, 8 Drawing Sheets

(56) References Cited

U.S. PATENT DOCUMENTS

| | | | | |
|---|---|---|---|---|
| 8,229,315 B2 * | 7/2012 | Sakai | ................... | G03G 15/234 399/85 |
| 2006/0133844 A1 * | 6/2006 | Konno | ................ | G03G 15/231 399/82 |
| 2015/0310315 A1 * | 10/2015 | Ichihashi | ............ | G03G 15/231 358/1.12 |
| 2015/0321878 A1 * | 11/2015 | Ichihashi | ........... | G03G 15/6514 271/3.19 |

FOREIGN PATENT DOCUMENTS

| | | | | |
|---|---|---|---|---|
| JP | 2009154540 A | * | 7/2009 | |
| JP | 2009169105 A | * | 7/2009 | |

* cited by examiner

IMAGE FORMING APPARATUS

CROSS-REFERENCE TO RELATED APPLICATION

This application is based upon and claims the benefit of priority from Japanese Patent Application No. 2014-190073 filed on Sep. 18, 2014, the entire contents of which are incorporated herein by reference.

BACKGROUND

The technology of the present disclosure relates to an image forming apparatus, and more particularly, to a technology for reducing sheets unnecessarily consumed by erroneous printing at the time of duplex printing.

From the standpoint of resource reuse and cost reduction, it is commonly performed to accommodate sheets (reused sheets) subjected to one side printing in a specific one of a plurality of sheet cassettes provided in an image forming apparatus, and to perform printing on a non-printed side of the reused sheet. However, at the time of duplex printing in which it is necessary to perform printing on a sheet (an unused sheet) non-printed on both sides, there is a case in which a sheet cassette having accommodated reused sheet is erroneously selected. In this case, there occurs erroneous printing in which printing is overlappingly performed on a printed side of the reused sheet.

In order to solve the aforementioned problem, there has been proposed a technology in which when whether unused sheets have been accommodated or reused sheets have been accommodated in each sheet cassette has been set in advance and an instruction to perform duplex printing has been received, if an indication that reused sheets have been accommodated in a sheet cassette indicated by the instruction has been set, one side printing is performed instead of the duplex printing. In this way, it is possible to avoid a situation in which printing is erroneously performed on a printed side of the reused sheet.

SUMMARY

An image forming apparatus according to one aspect of the present disclosure includes a sheet feeding unit, a sheet conveying unit, a reception section, an image forming unit, a discharge tray, and an operation control section. The sheet feeding unit includes a sheet cassette and a manual feed tray and feeds sheets accommodated in the sheet cassette and sheets accommodated in the manual feed tray. The sheet conveying unit includes a sheet reversing mechanism that reverses a front side and a back side of the sheet and conveys the sheet fed by the sheet feeding unit. The reception section receives a printing instruction. The image forming unit forms an image based on image data indicated by the printing instruction received by the reception section on the sheet. To the discharge tray, the sheet with the image formed by the image forming unit is discharged. The operation control section controls operations of the sheet feeding unit, the sheet conveying unit, and the image forming unit.

When the reception section receives a duplex printing instruction, the operation control section controls the sheet feeding unit to feed one sheet from a sheet cassette indicated by a duplex printing instruction, controls the image forming unit to form an image of a first page based on image data indicated by the duplex printing instruction on one side of the sheet, and controls the sheet conveying unit to discharge the sheet with the formed image to the discharge tray. When the reception section has received an instruction indicating that the sheet discharged to the discharge tray is an unused sheet with the formed image and the sheet has been set in the manual feed tray, the operation control section controls the sheet feeding unit to feed the sheet set in the manual feed tray, and controls the image forming unit to form an image of a second page based on the image data indicated by the duplex printing instruction on the other side of the sheet. And then, the operation control section controls the sheet feeding unit to feed a sheet from the sheet cassette indicated by the duplex printing instruction, and controls the image forming unit to form images of a third page and subsequent pages based on the image data indicated by the duplex printing instruction on both sides of the sheet.

DETAILED DESCRIPTION

Figure 1:
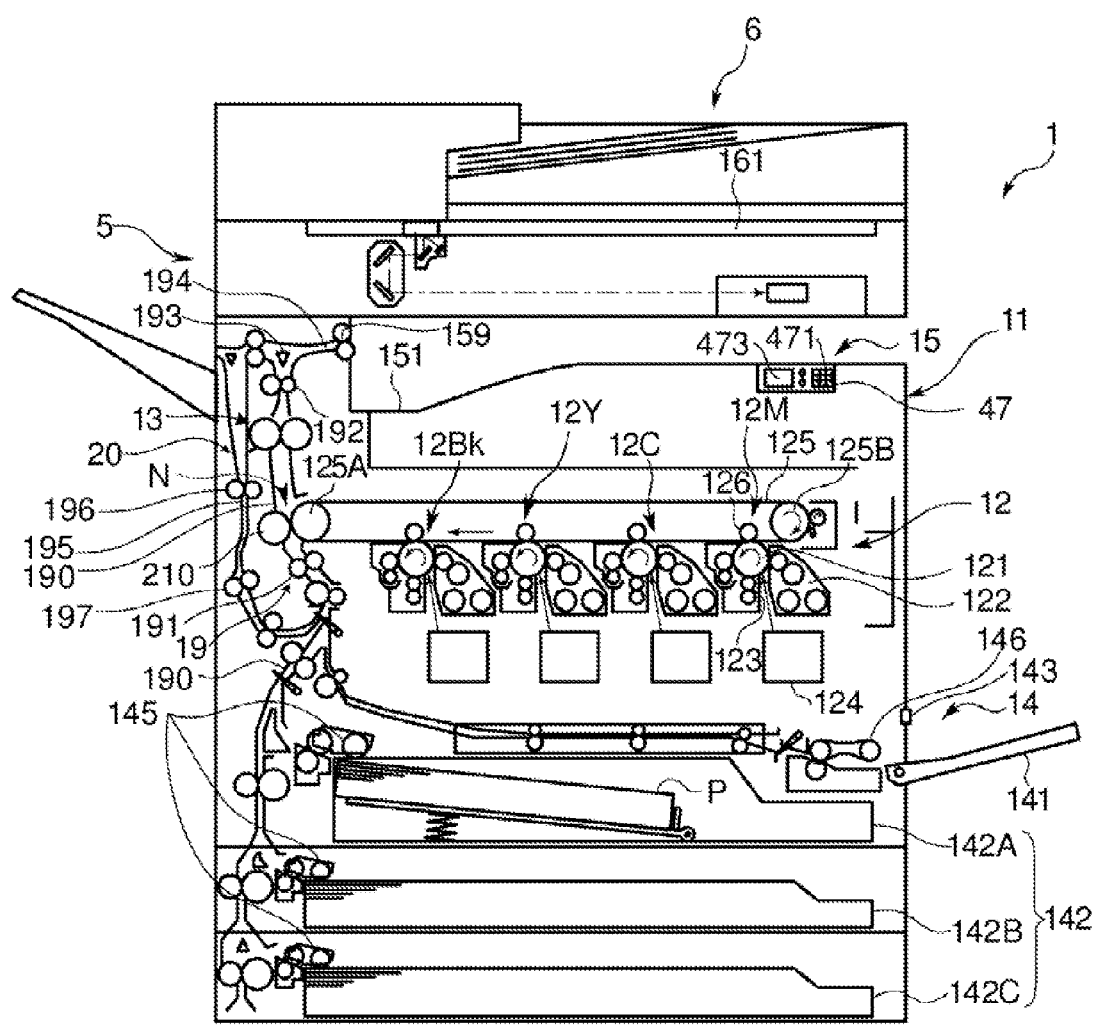
FIG. 1 is a diagram illustrating a structure of an image forming apparatus according to the present embodiment.

Hereinafter, an image forming apparatus according to the present embodiment will be described with reference to the drawings. FIG. 1 is a diagram illustrating a structure of an image forming apparatus according to the present embodiment.

An image forming apparatus 1 according to the present embodiment, for example, is a multifunctional peripheral having a plurality of functions such as a copy function, a printer function, a scanner function, and a facsimile function. The image forming apparatus 1 is provided an apparatus body 11 thereof with an image forming unit 12, a fixing unit 13, a sheet feeding unit 14, a sheet conveying unit 19, a document reading unit 5, and a document feeding section 6.

When the image forming apparatus 1 performs a document reading operation, the document reading unit 5 optically reads an image of a document fed by the document feeding section 6 or a document placed on a document placement glass 161, and generates image data.

When the image forming apparatus 1 performs an image forming operation, the image forming unit 12 forms (prints) an image on a sheet P fed from the sheet feeding unit 14 and conveyed by the sheet conveying unit 19, on the basis of image data generated by the aforementioned document reading operation, image data received from a network-connected computer and the like.

The sheet feeding unit 14 includes a plurality of sheet cassettes 142 insertable and detachable to/from the apparatus body 11. In the example illustrated in FIG. 1, the sheet cassette 142 includes three sheet cassettes 142A, 142B, and 142C. Above the sheet cassettes 142A, 142B, and 142C, sheet feeding rollers 145 are respectively provided, and sheets P accommodated in the sheet cassettes 142A, 142B, and 142C are delivered toward a conveyance path 190 by the sheet feeding rollers 145. Furthermore, the sheet feeding unit 14 includes a manual feed tray 141 provided to a wall surface of the apparatus body 11 so as to be freely openable and closable. Sheets P set in the manual feed tray 141 are delivered toward the conveyance path 190 by a sheet feeding roller 146.

The sheet conveying unit 19 includes conveying roller pairs 191 and 192 provided at appropriate positions of the conveyance path 190. A sheet P fed from the sheet feeding unit are conveyed in the conveyance path 190 by the conveying roller pairs 191 and 192.

Image forming units 12M, 12C, 12Y, and 12Bk of the image forming unit 12 respectively include a photosensitive drum 121, a developing device 122 that supplies toner to the photosensitive drum 121, a toner cartridge (not illustrated) that accommodates toner, a charging device 123, an exposure device 124, and a primary transfer roller 126.

In the case of performing color printing, the image forming unit 12M for magenta, the image forming unit 12C for cyan, the image forming unit 12Y for yellow, and the image forming unit 12Bk for black of the image forming unit 12 respectively form toner images on the photosensitive drum 121 by charging, exposure, and developing processes on the basis of image data including respective color components constituting image data, and allow the toner images to be transferred to an intermediate transfer belt 125 stretched around a driving roller 125A and a driven roller 125B by the primary transfer roller 126.

The intermediate transfer belt 125 has an outer peripheral surface with an image bearing surface to which the toner images are transferred, and is driven by the driving roller 125A in the state in which the intermediate transfer belt 125 abuts an outer surface of the photosensitive drum 121. The intermediate transfer belt 125 endlessly travels between the driving roller 125A and the driven roller 125B while synchronizing with each photosensitive drum 121.

The toner images of each color transferred onto the intermediate transfer belt 125 overlap with one another on the intermediate transfer belt 125 and become a color toner image. A secondary transfer roller 210 allows the color toner image formed on the surface of the intermediate transfer belt 125 to be transferred to the sheet P conveyed by the conveying roller pair 191 in a nip portion N between the secondary transfer roller 210 and the driving roller 125A while interposing the intermediate transfer belt 125 therebetween. Then, the fixing unit 13 allows the toner image on the sheet P to be fixed to the sheet P by thermal fixing. The sheet P subjected to the fixing process and the image formation is conveyed through a sheet discharge conveyance path 194 (a part of the conveyance path 190) extending from an upper portion of the fixing unit and discharged to a discharge tray 151 by a discharge roller pair 159 through.

Herein, the image forming apparatus 1 has two operation modes of a normal duplex printing mode and an erroneous printing confirmation duplex printing mode in relation to a duplex printing operation for forming an image on both sides of a sheet P. The switching of the operation mode is performed on the basis of a user instruction received by a reception section 103 (FIG. 3) of a control unit 10 to be described later. The normal duplex printing mode is an operation mode in which duplex printing is performed by a method similar to that of duplex printing in a general image forming apparatus. Furthermore, the erroneous printing confirmation duplex printing mode is an operation mode in which duplex printing is continued when an image of a first page based on image data indicated by a duplex printing instruction is formed on one side of one sheet P, the sheet P is discharged to the discharge tray 151, a user is allowed to confirm whether the sheet P is an unused sheet with the image formed thereon or a reused sheet with the image formed thereon (erroneous printing), and then it is confirmed that the sheet P is the unused sheet with the image formed thereon. Hereinafter, firstly, operations of the sheet feeding unit 14 and the sheet conveying unit 19 in the normal duplex printing mode will be described.

Figure 2A:
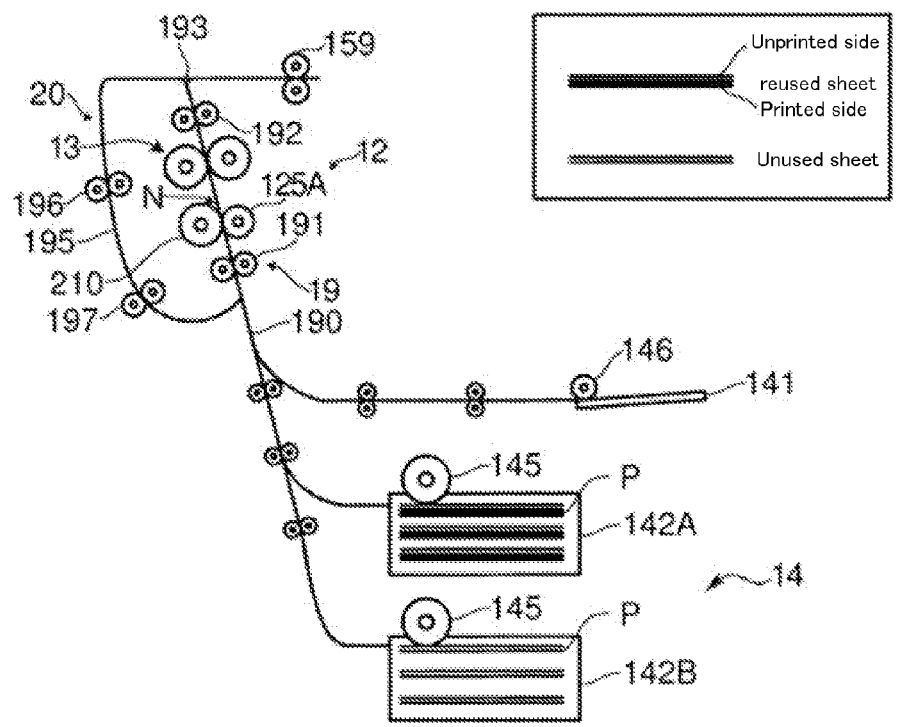
FIG. 2A is a diagram illustrating a structure of a sheet feeding unit and a sheet conveying unit of the image forming apparatus according to the present embodiment.
Figure 2B:
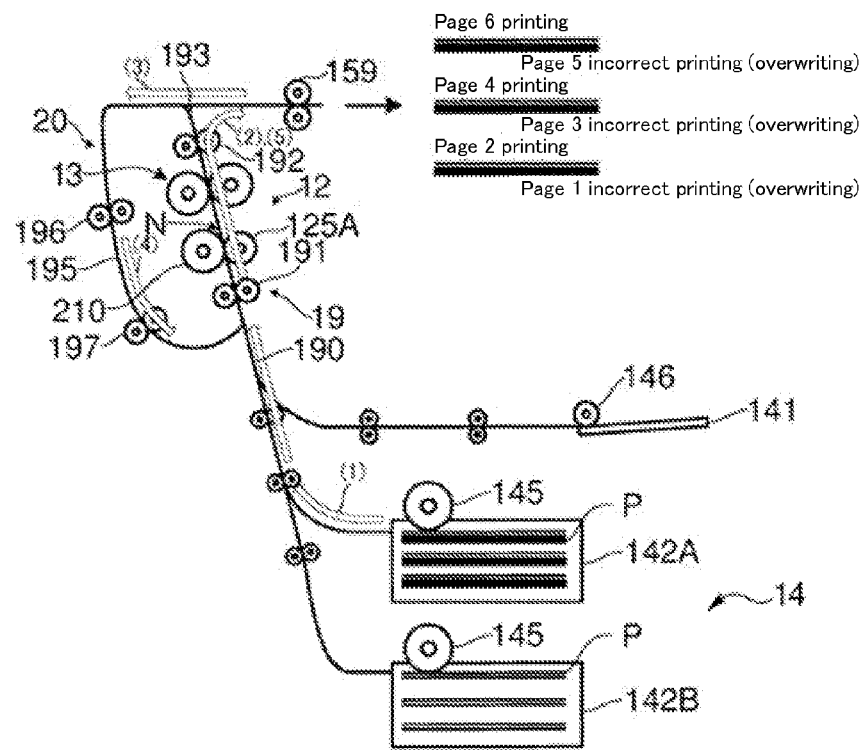
FIG. 2B is a diagram illustrating the movement of sheets at the time of duplex printing.

FIG. 2A is a diagram illustrating the structure of the sheet feeding unit 14 and the sheet conveying unit 19. Furthermore, FIG. 2B is a diagram illustrating the movement of a sheet P at the time of duplex printing. In the examples illustrated in FIG. 2A and FIG. 2B, reused sheets are accommodated in the sheet cassette 142A and unused sheets are accommodated in the sheet cassette 142B. At the time of duplex printing, based on the control of an operation control section 101 (see FIG. 3) of the control unit 10 to be described later, the sheet feeding rollers 145 delivers a sheet P accommodated in the sheet cassette 142A indicated by a duplex printing instruction received by the reception section 103 toward the conveyance path 190 (an arrow (1) of FIG. 2B). Then, the image forming unit 12 forms, on one side of the sheet P, an image based on image data of an even-numbered page among image data indicated by an image forming instruction received by the reception section 103. After being subjected to a fixing process the sheet P is nipped between the discharge roller pair 159 provided to the discharge tray 151 side (an arrow (2) of FIG. 2B). The sheet conveying unit 19 is provided with a sheet reversing mechanism 20 that reverses the front and the back of a sheet and the discharge roller pair 159, which is a part of the sheet reversing mechanism 20, switches back the sheet P (an arrow (3) of FIG. 2B). The conveyance path 190 is provided with a conveyance branch guide 193, and by the conveyance branch guide 193, the sheet P switched back by the discharge roller pair 159 is sent to a reversing conveyance path 195 branched from the sheet discharge conveyance path 194 and provided as a part of the conveyance path 190 (an arrow (4) of FIG. 2B). Furthermore, by a conveying roller pairs 196 and 197 provided at each part of the reversing conveyance path 195, the sheet P is conveyed again to a region upstream of the aforementioned nip portion N and the fixing unit 13 in a sheet conveyance direction, and an image is formed on the other side of the sheet P by the image forming unit 12 (an arrow (5) of FIG. 2B). Thereafter, the sheet P is discharged to the discharge tray 151 by the discharge roller pair 159.

When duplex printing is performed, the sheet cassette 142B having accommodated the unused sheets should be originally selected, but in the example illustrated in FIG. 2B, the sheet cassette 142A having accommodated the reused sheets is erroneously selected. As a consequence, an image based on image data of odd-numbered pages (page 1, page 3, and page 5) is overlappingly formed on the image-formed side of the reused sheets.

Figure 3:
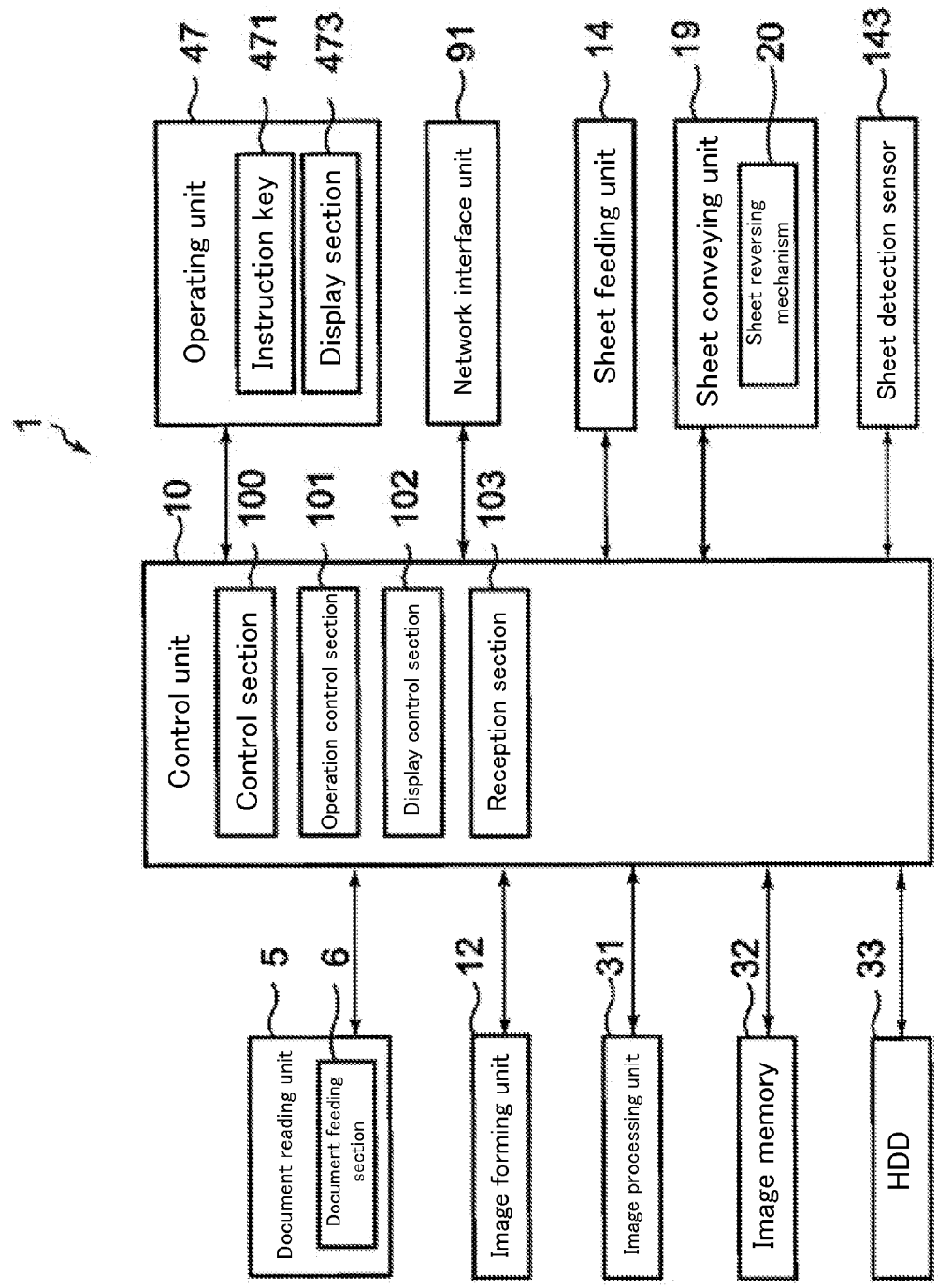
FIG. 3 is a block diagram illustrating an internal configuration of the image forming apparatus according to the present embodiment.

Subsequently, an internal configuration of the image forming apparatus 1 will be described. FIG. 3 is a block diagram illustrating the internal configuration of the image forming apparatus 1.

An operating unit 47 includes a plurality of instruction keys 471 and a display section 473, and receives an instruction from a user with respect to various operations and processes executable by the image forming apparatus 1. The display section 473 includes a liquid crystal display or an organic EL display and displays operating screens and the like drawn by a display control section 102 of the control unit 10 to be described later.

The instruction keys 471, for example, includes a call key for calling the operating screens and the like, an arrow key for moving focus of GUI constituting the operating screens and the like, a decision key for performing a deciding operation with respect to the GUI constituting the operating screens and the like, a character input key for performing character input, a numerical value input key for performing numerical value input, and the like, and receives an operation by a user in response to operating screens and the like displayed on the display section 473.

An image processing unit 31 performs image processing on image data, which has been read by the document reading unit 5, according to necessity. For example, in order to improve the quality of an image formed by the image forming unit 12, the image processing unit 31 performs predetermined image processing, such as shading correction, on the image data read by the document reading unit 5.

An image memory 32 is a region that temporarily stores the image data obtained by the reading of the document reading unit 5 or temporarily preserves data serving as a print target of the image forming unit 12.

A HDD (Hard Disk Drive) 33 is used to preserve image data and the like output from the document reading unit 5.

A network interface unit 91 includes a communication module such as a LAN port, and performs transmission/reception of various types of data with a computer and the like in a local area via a LAN and the like connected to the network interface unit 91.

A sheet detection sensor 143 is a reflection type sensor having a light emitting element and a light receiving element (not illustrated), and is provided above the manual feed tray 141. The light emitting element is a light emitting element such as an LED, has a main emission direction arranged toward the manual feed tray 141, and emits visible light toward the manual feed tray 141. Furthermore, the light receiving element is a light receiving element such as a photodiode or a phototransistor, has a main light receiving direction arranged toward the manual feed tray 141, and receives the visible light reflected by the manual feed tray 141 or reflected by a sheet P set in the manual feed tray 141. The light receiving element photoelectric converts the received visible light to output a signal corresponding to the amount of the received visible light. The sheet detection sensor 143 detects a set or a non-set of the sheet P to the manual feed tray 141 on the basis of the signal output from the light receiving element.

In addition, in the aforementioned description, the case in which the sheet detection sensor 143 is a so-called reflection type visible light sensor has been described; however, the technology of the present disclosure is not necessarily limited thereto. For example, the sheet detection sensor 143 may also be a reflection type infrared light sensor that emits infrared light, not the visible light, thereby detecting the set or non-set of the sheet P to the manual feed tray 141.

The control unit 10 includes a CPU (Central Processing Unit), a RAM (Random Access Memory), and a ROM (Read Only Memory). The control unit 10 serves as a control section 100, the operation control section 101, the display control section 102, and the reception section 103 when the aforementioned CPU executes a control program such as a duplex printing control program stored in the aforementioned ROM, HDD 33, and the like. In addition, the control section 100, the operation control section 101, the display control section 102, and the reception section 103 of the control unit 10 may also be respectively configured by a hardware circuit regardless of an operation based on the aforementioned control program.

The control section 100 performs general control of the image forming apparatus 1.

The operation control section 101 controls the operations of the image forming unit 12, the sheet feeding unit 14, the sheet conveying unit 19 and the like, thereby forming an image based on image data indicated by a printing instruction (job) received by the reception section 103 on a sheet P. Details of processing by the operation control section 101 will be described later.

The display control section 102 controls the display operation by the display section 473.

The reception section 103 receives an image formation-related instruction input by a user via the operating unit 47.

Figure 4:
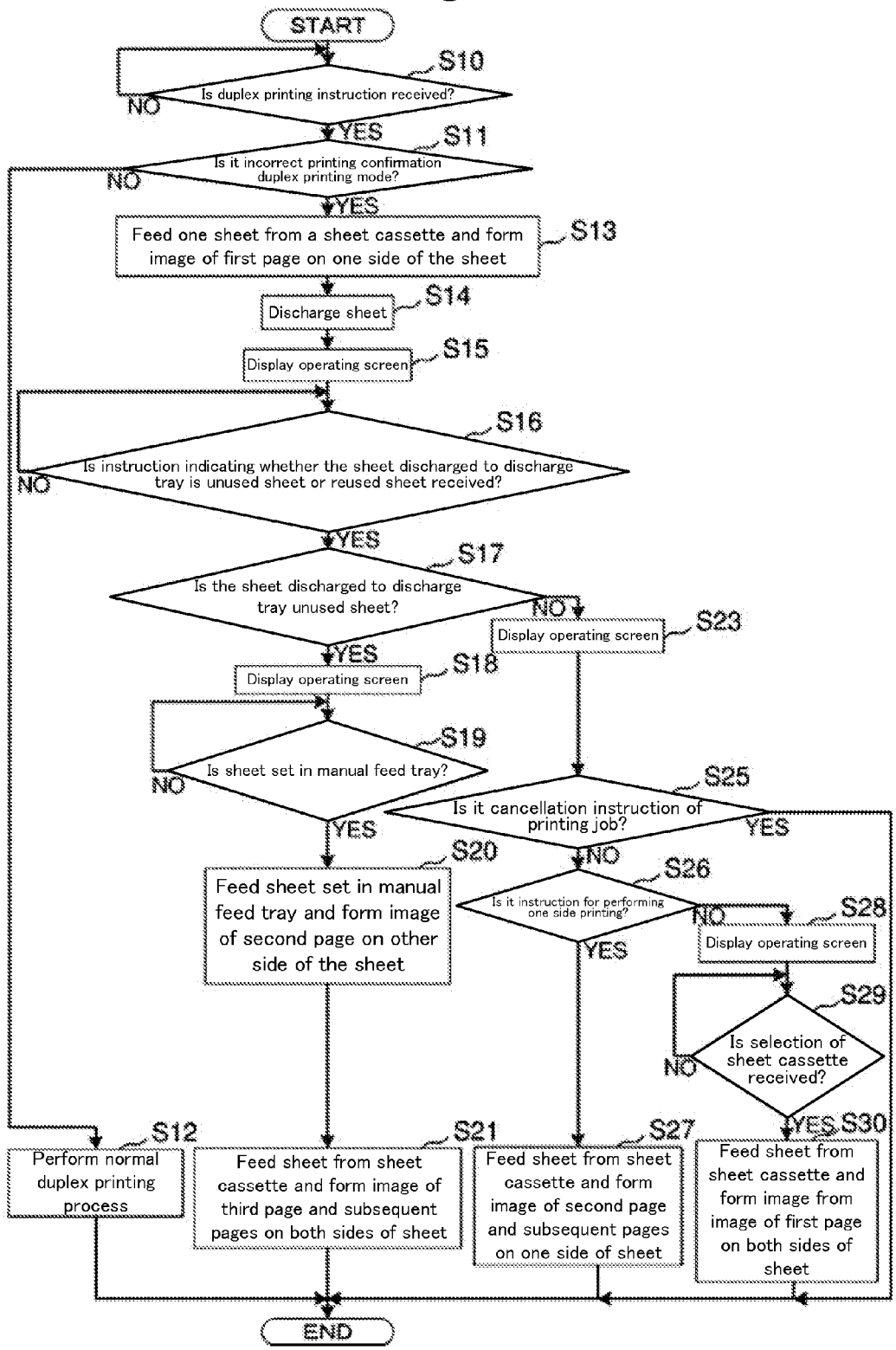
FIG. 4 is a flowchart illustrating a flow of an operation of the image forming apparatus according to the present embodiment.

Subsequently, the operation of the image forming apparatus 1 having the aforementioned configuration will be described. FIG. 4 is a flowchart illustrating the flow of the operation of the image forming apparatus 1.

The reception section 103 determines whether an instruction (a duplex printing instruction) indicating that an image should be formed on both sides of a sheet P has been received (step S10).

When the duplex printing instruction has been received (YES in step S10), the operation control section 101 determines whether a current operation mode regarding duplex printing is the normal duplex printing mode or the erroneous printing confirmation duplex printing mode (step S11). The operation mode regarding duplex printing is set in advance on the basis of a user instruction input via the operating unit 47. Based on the control of the display control section 102, a predetermined selection screen is displayed on the display section 473. On the basis of a user instruction input based on the selection screen, the reception section 103 receives the setting of the operation mode regarding duplex printing.

When the current operation mode regarding duplex printing is the normal duplex printing mode (NO in step S11), the operation control section 101 performs a normal duplex printing process (step S12). Since the process is a well-known technology, a description thereof will be omitted.

On the other hand, when the current operation mode regarding duplex printing is the erroneous printing confirmation duplex printing mode (YES in step S11), the operation control section 101 allows one sheet P to be fed from the sheet cassette 142 indicated by the duplex printing instruction received by the reception section 103 in the process of step S10. Then, the operation control section 101 controls the image forming unit 12 to form an image of a first page based on image data indicated by the duplex printing instruction on one side of the sheet P (step S13). Then, the operation control section 101 controls the sheet conveying unit 19 to discharge the sheet P with the image of the first page formed thereon to the discharge tray 151 (step S14).

Figure 5A:
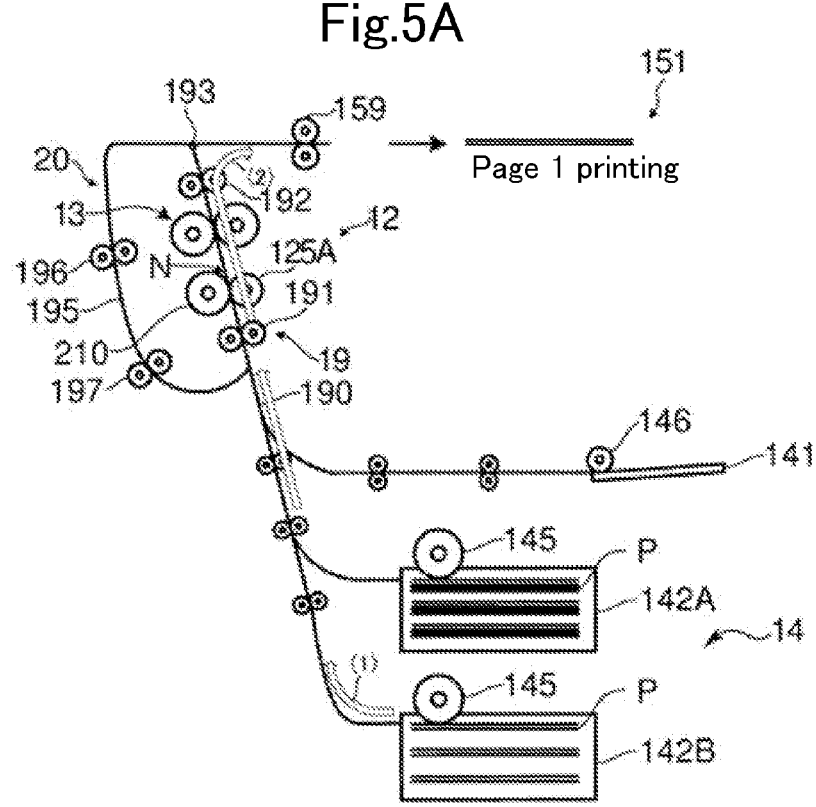
FIG. 5A and FIG. 5B are diagrams illustrating the movement of a sheet in a process of forming an image of a first page on one side of the sheet.
Figure 5B:
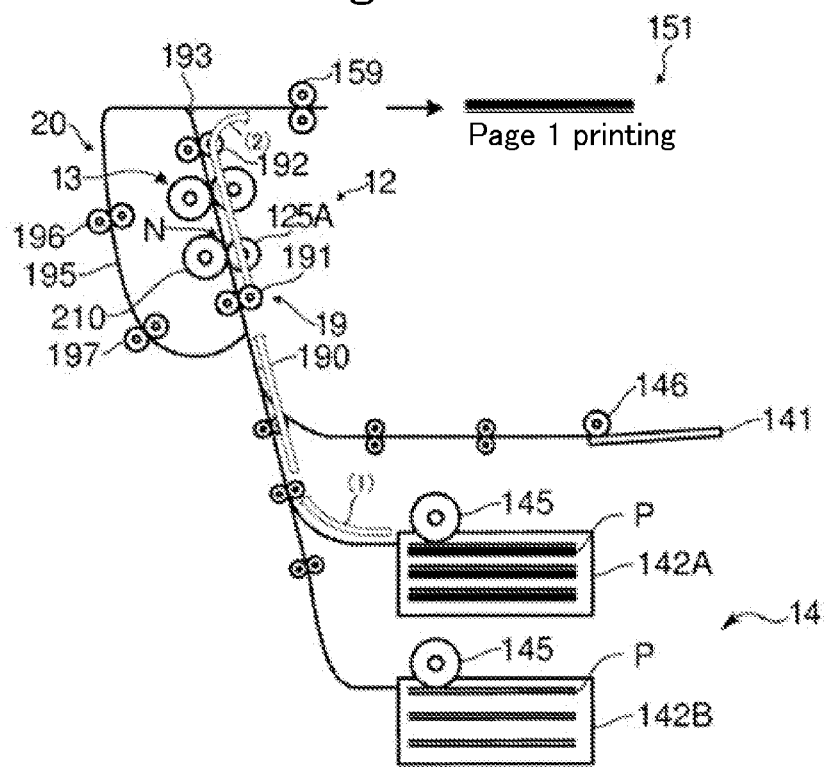

FIG. 5A and FIG. 5B are diagrams illustrating the movement of the sheet P in the processes of step S13 and step S14. When the sheet cassette 142B having accommodated the unused sheets has been selected in the duplex printing instruction, the sheet P, which is an unused sheet with the image of the first page formed on one side thereof, is discharged by the processes (an arrow (1) and an arrow (2) of FIG. 5A) of step S13 and step S14 as illustrated in FIG. 5A. On the other hand, when the sheet cassette 142A having accommodated the reused sheets has been erroneously selected in the duplex printing instruction, the sheet P, which is a reused sheet with the image of the first page formed on a non-printed side thereof, is discharged by the processes (an arrow (1) and an arrow (2) of FIG. 5B) of step S13 and step S14 as illustrated in FIG. 5B.

Figure 6A:
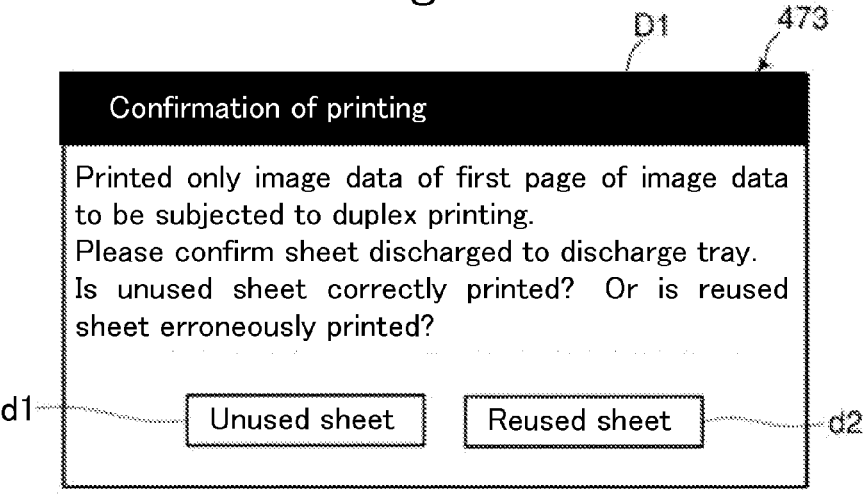
FIG. 6A, FIG. 6B, and FIG. 6C are diagrams illustrating operating screens displayed on a display unit of the image forming apparatus according to the present embodiment.

After the process of step S14, the display control section 102 controls the display section 473 to display a predetermined operating screen (step S15). FIG. 6A is a diagram illustrating an example of the operating screen displayed on the display section 473. In the example illustrated in FIG. 6A, an operating screen D1 displays an indication that the sheet P discharged to the discharge tray 151 should be confirmed by a user, and an indication that a user should input an instruction indicating whether the sheet P discharged to the discharge tray 151 is a printed unused sheet or a printed reused sheet.

After the operating screen D1 is displayed, the reception section 103 determines whether the instruction indicating whether the sheet P discharged to the discharge tray 151 is the printed unused sheet or the printed reused sheet has been received (step S16). In the example illustrated in FIG. 6A, when an operating button d1 provided to the operating screen D1 has been selected by a user, the reception section 103 receives the instruction indicating that the sheet P discharged to the discharge tray 151 is the printed unused sheet. Furthermore, when an operating button d2 provided to the operating screen D1 has been selected by a user, the reception section 103 receives the instruction indicating that the sheet P discharged to the discharge tray 151 is the printed reused sheet.

Figure 6B:
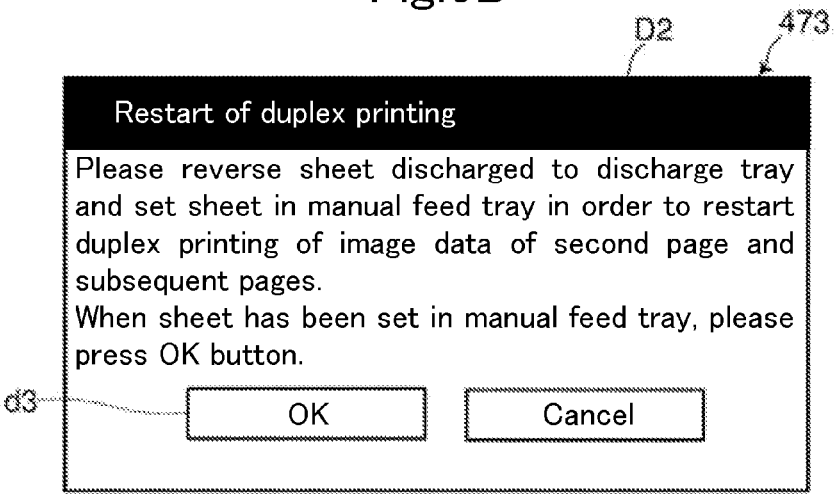

When the sheet P discharged to the discharge tray 151 is the unused sheet (YES in step S17), the display control section 102 controls the display section 473 to display a predetermined operating screen (step S18). FIG. 6B is a diagram illustrating an example of the operating screen displayed on the display section 473. In the example illustrated in FIG. 6B, an operating screen D2 displays an indication that duplex printing of images of a second page and subsequent pages is performed, and an indication that a user should reverse the sheet P discharged to the discharge tray 151 and set the sheet P in the manual feed tray 141.

After the operating screen D2 is displayed, the reception section 103 determines whether the sheet P has been set in the manual feed tray 141 (step S19). For example, when an operating button d3 provided to the operating screen D2 has been selected by a user, the reception section 103 receives the instruction that the sheet P discharged to the discharge tray 151 has been set in the manual feed tray 141. Furthermore, when a detection signal has been output from the sheet detection sensor 143, the reception section 103 receives an instruction that the sheet P discharged to the discharge tray 151 has been set in the manual feed tray 141.

When the sheet P has been set in the manual feed tray 141 (YES in step S19), the operation control section 101 controls the sheet conveying unit 19 to feed one sheet P set in the manual feed tray 141 and the image forming unit 12 to form the image of the second page based on the image data indicated by the duplex printing instruction on the other side of the sheet P (step S20).

After the process of step S20, the operation control section 101 controls the sheet feeding unit 14 to feed the sheet P from the sheet cassette 142 indicated by the duplex printing instruction, and controls the image forming unit 12 to form images of a third page and subsequent pages based on the image data indicated by the duplex printing instruction on both sides of the sheet P (step S21).

Figure 7A:
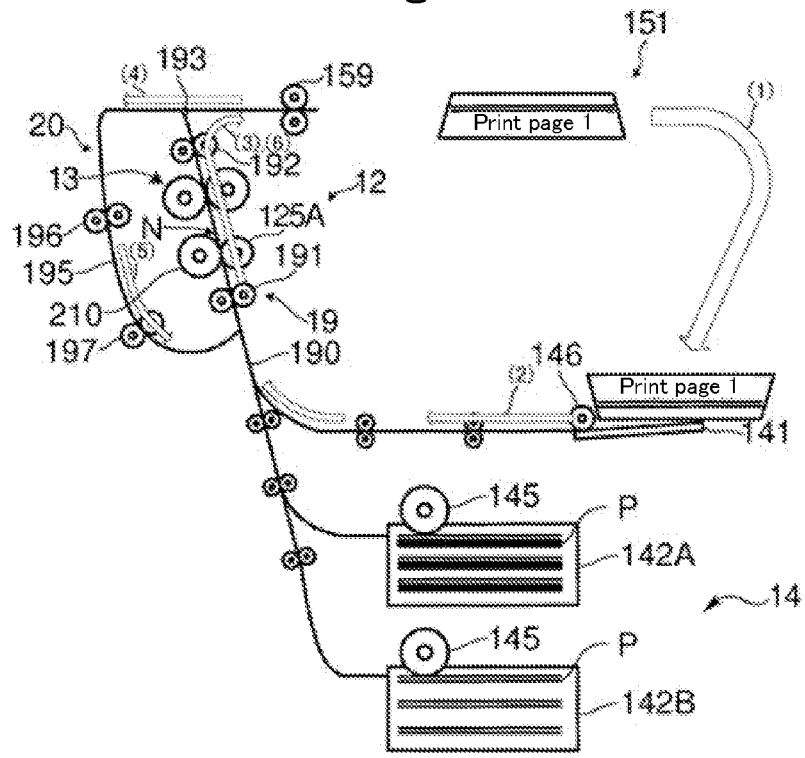
FIG. 7A is a diagram illustrating the movement of the sheet in a process of forming an image of a second page on the other side of the sheet.

FIG. 7A is a diagram illustrating the movement of the sheet P in the processes of step S15 to step S20. When the sheet cassette 142B having accommodated the unused sheets has been selected in the duplex printing instruction, the sheet P, which is the unused sheet with the image of the first page formed on one side thereof, is discharged to the discharge tray 151 by the processes of step S13 and step S14. The sheet P is reversed by a user while the image forming apparatus 1 is performing the processes of step S15 to step S19, and is moved to the manual feed tray 141 from the discharge tray 151 (an arrow (1) of FIG. 7A). At this time, the sheet P is set in the manual feed tray 141 so that the side thereof on which the image of the first page has been formed faces upward.

Thereafter, by the process of step S20, the sheet P is fed by the sheet feeding roller 146 (an arrow (2) of FIG. 7A). The sheet P is not subjected to image formation by the image forming unit 12 (an arrow (3) of FIG. 7A), is switched back by the discharge roller pair 159 (an arrow (4) of FIG. 7A), is sent to the reversing conveyance path 195 (an arrow (5) of FIG. 7A), and the front side and the back side of the sheet P are reversed. Then, the sheet P is conveyed again to the region upstream of the nip portion N and the fixing unit 13 in the sheet conveyance direction so that the image of the second page based on the image data is formed by the image forming unit 12 (an arrow (6) of FIG. 7A), and is discharged to the discharge tray 151 by the discharge roller pair 159. In this way, the duplex printing of the images of the first page and the second page based on the image data indicated by the duplex printing instruction is completed.

Figure 7B:
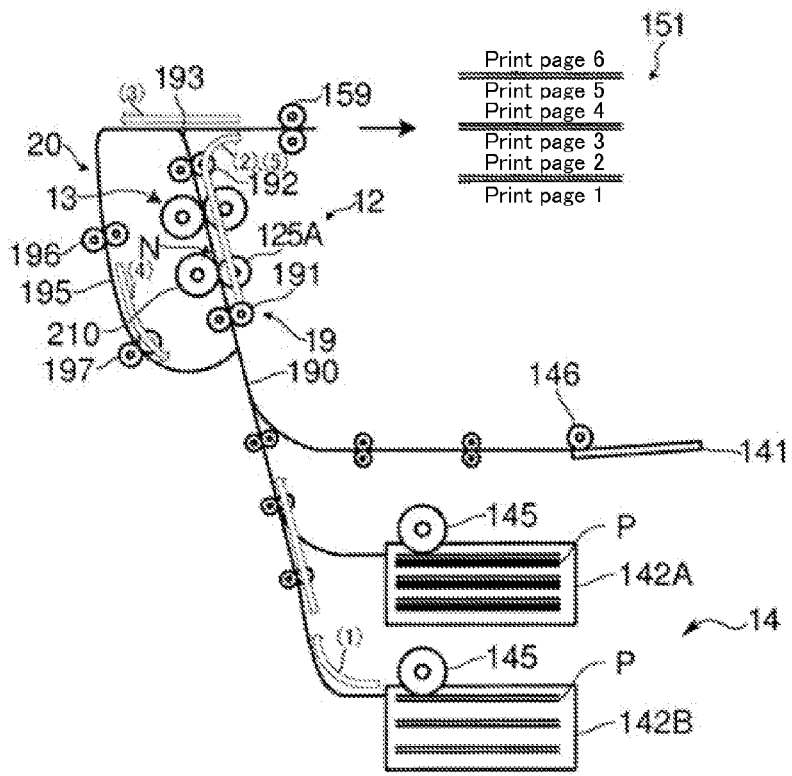
FIG. 7B is a diagram illustrating the movement of a sheet in a process of forming images of a third page and subsequent pages on both sides of the sheet.

FIG. 7B is a diagram illustrating the movement of the sheet P in the process of step S21. In the process of step S21, the sheet P is fed from the sheet cassette 142B selected in the duplex printing instruction (an arrow (1) of FIG. 7B). Thereafter, an image based on image data of even-numbered pages (page 4, page 6 . . . ) is formed on one side of the sheet P by the image forming unit 12 (an arrow (2) of FIG. 7B), is switched back by the discharge roller pair 159 (an arrow (3) of FIG. 7B), is sent to the reversing conveyance path 195 (an arrow (4) of FIG. 7B), and the front side and the back side of the sheet P are reversed. Then, the sheet P is conveyed again to the region upstream of the nip portion N and the fixing unit 13 in the sheet conveyance direction so that an image based on image data of odd-numbered pages (page 3, page 5 . . . ) is formed by the image forming unit 12 (an arrow (5) of FIG. 7B), and is discharged to the discharge tray 151 by the discharge roller pair 159. In this way, the duplex printing of the images of the third page and the subsequent pages based on the image data indicated by the duplex printing instruction is completed. As a consequence, the sheets P, on which all the images based on the image data indicated by the duplex printing instruction have been subjected to the duplex printing, are discharged to the discharge tray 151.

Figure 6C:
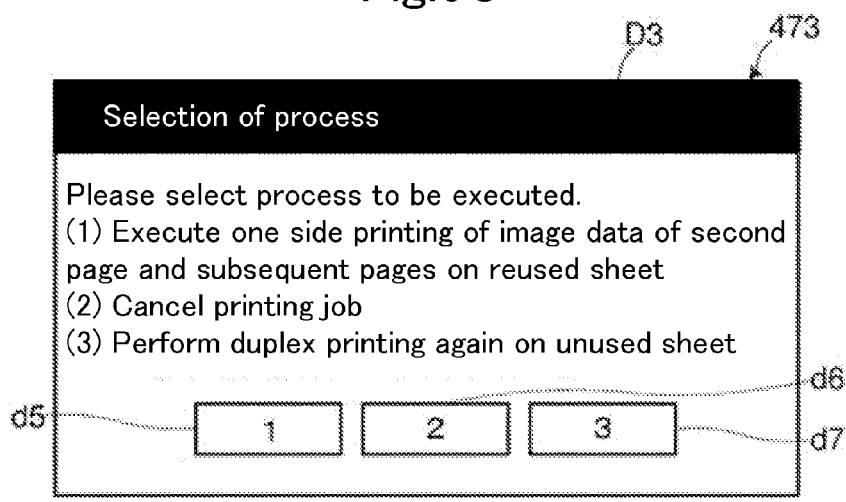

On the other hand, when the sheets P discharged to the discharge tray 151 is the reused sheets, not the unused sheets (NO in step S17), the display control section 102 controls the display section 473 to display a predetermined operating screen (step S23). FIG. 6C is a diagram illustrating an example of the operating screen displayed on the display section 473. In the example illustrated in FIG. 6C, an operating screen D3 displays an indication that a process to be executed should be selected from among three processes of a process of performing one side printing of the images of the second page and the subsequent pages, a process of stopping a printing job, and a process of performing duplex printing on an unused sheet again.

After the operating screen D3 is displayed, when an operating button d6 provided to the operating screen D3 has been selected by a user, the reception section 103 receives a cancellation instruction of a printing job (YES in step S25). In this case, the operation control section 101 stops the printing job based on the duplex printing instruction received in the process of step S10 and ends the process.

Furthermore, after the operating screen D3 is displayed, when an operating button d5 provided to the operating screen D3 has been selected by a user, the reception section 103 receives an instruction for performing one side printing of the images of the second page and the subsequent pages (YES in step S26). In this case, the operation control section 101 controls the sheet feeding unit 14 to feed a sheet P from the sheet cassette 142A indicated by the duplex printing instruction received in the process of step S10, and controls the image forming unit 12 to form the images of the second page and the subsequent pages based on the image data indicated by the duplex printing instruction on one side of the sheet P (step S27).

Figure 8:
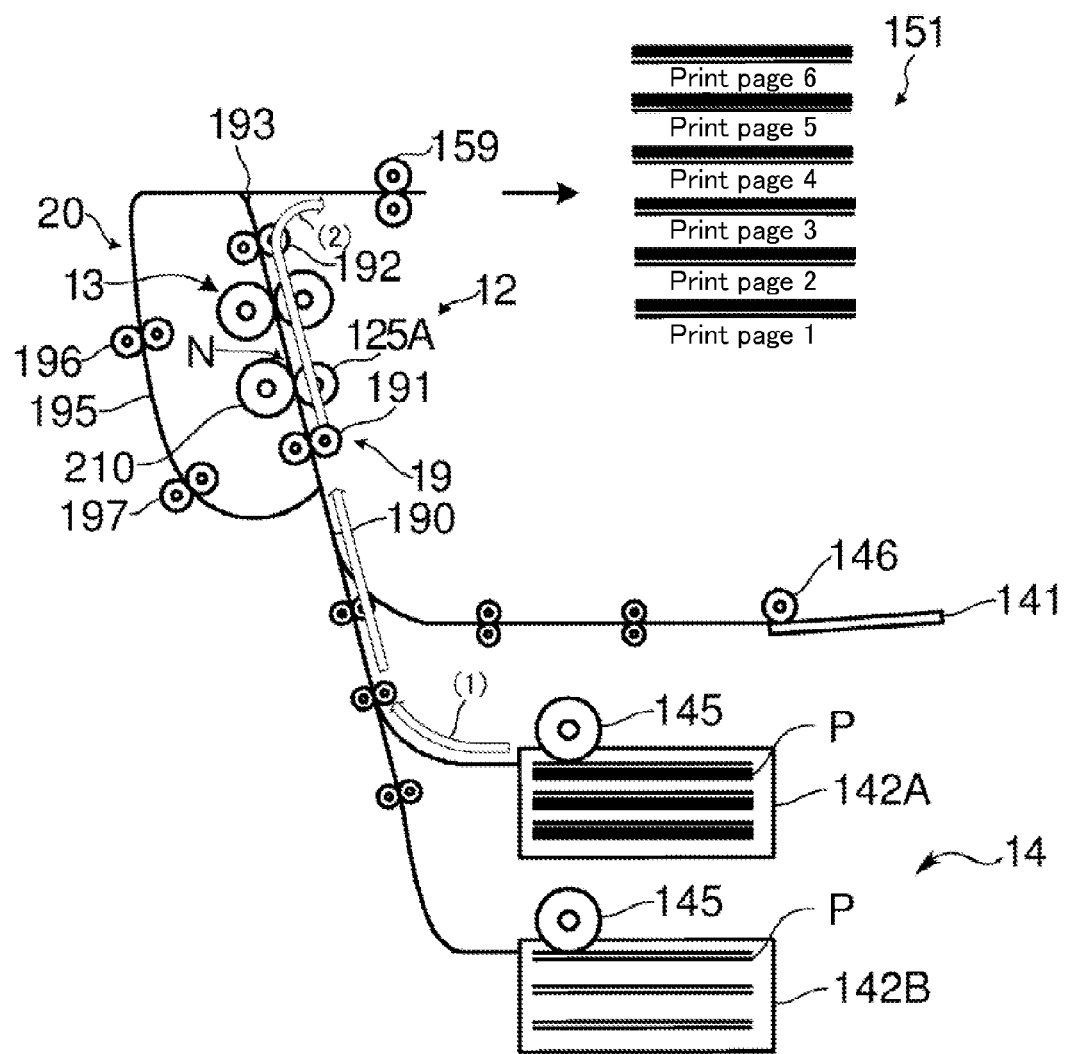
FIG. 8 is a diagram illustrating the movement of a reused sheet in a process of forming images of a second page and subsequent pages on a non-printed side of the reused sheet.

FIG. 8 is a diagram illustrating the movement of the sheet P in the process of step S27. When the sheet cassette 142A having accommodated the reused sheets has been erroneously selected in the duplex printing instruction, the sheet P, which is the reused sheet with the image of the first page formed on the non-printed side thereof, is discharged by the processes of step S13 and step S14. In the process of step S27, the sheet P is fed from the sheet cassette 142A erroneously selected in the duplex printing instruction (an arrow (1) of FIG. 8). Thereafter, an image based on the image data of the second page and the subsequent pages is formed on the non-printed side of the reused sheet by the image forming unit 12 (an arrow (2) of FIG. 8), and is discharged to the discharge tray 151 by the discharge roller pair 159. In this way, the sheets P, on which all the images based on the image data indicated by the duplex printing instruction have been subjected to one side printing, are discharged to the discharge tray 151.

Furthermore, after the operating screen D3 is displayed, when an operating button d7 provided to the operating screen D3 has been selected by a user, the reception section 103 receives an instruction for performing the duplex printing on the unused sheets again (NO in step S26). In this case, the display control section 102 controls the display section 473 to display a predetermined operating screen (step S28). Then, on the basis of a user operation input based on the operating screen, the reception section 103 receives selection of the sheet cassette 142B having accommodated the unused sheets (step S29).

The operation control section 101 controls the sheet feeding unit 14 to feed a sheet P from the sheet cassette 142B selected in the process of step S29, and controls the image forming unit 12 to form all the images based on the image data indicated by the duplex printing instruction received in the process of step S10 on both sides of the sheets P (step S30).

As described above, in accordance with the image forming apparatus 1 according to the present embodiment, when the duplex printing is performed, the image of the first page based on the image data indicated by the duplex printing instruction is formed on one side of one sheet P and then the sheet P is discharged to the discharge tray 151, thereby allowing a user to confirm whether the sheet P is an unused sheet with the image formed thereon or a reused sheet with the image formed thereon (erroneous printing). Then, the image forming apparatus 1 continues the duplex printing only when the sheet P is the unused sheet with the image formed thereon. In this way, although the sheet cassette 142 having accommodated the reused sheets has been erroneously selected when the duplex printing is performed, it is possible to minimize wasteful sheets through a simple operation.

In addition, the technology of the present disclosure is not limited to the configuration of the aforementioned embodiments and various modifications can be made. For example, in the aforementioned each embodiment, an embodiment of the image forming apparatus has been described using a multifunctional peripheral. However, this is merely an example, and the image forming apparatus, for example, may also be other image forming apparatuses such as a printer, a copy machine, and a facsimile machine.

Furthermore, it should be noted that the technical scope of the present disclosure is not limited to the configurations and processes indicated by the aforementioned embodiment using FIGS. 1-8.

What is claimed is:

1. An image forming apparatus comprising:
   a sheet feeding unit configured to have a first sheet cassette accommodating unused sheets on which no image is printed on either side thereof, a second sheet cassette accommodating reused sheets on which an image is printed on only one side thereof, and a manual feed tray and to selectively feed sheets accommodated in the first sheet cassette, the second sheet cassette, and the manual feed tray;
   a sheet conveying unit configured to include a sheet reversing mechanism that reverses a front side and a back side of a sheet and to convey the sheet fed by the sheet feeding unit;
   a reception section configured to receive a printing instruction;
   an image forming unit configured to form an image, based on image data indicated by the printing instruction received by the reception section, on the sheet;
   a discharge tray onto which the sheet with the image formed by the image forming unit is discharged; and
   an operation control section configured to control operations of the sheet feeding unit, the sheet conveying unit, and the image forming unit, wherein
   the reception section is configured to be capable of receiving an instruction indicating that the sheet discharged to the discharge tray is an unused sheet, fed from the first sheet cassette, on which an image is formed, or a reused sheet, fed from the second sheet cassette, on which an image is formed,
   when the reception section has received a duplex printing instruction, the operation control section controls the sheet feeding unit to feed one sheet from one of the first and second sheet cassettes indicated by the duplex printing instruction, controls the image forming unit to form an image of a first page based on image data indicated by the duplex printing instruction on one side of the sheet, and controls the sheet conveying unit to discharge the sheet on which the image is formed to the discharge tray, when the reception section has received the instruction indicating that the sheet discharged to the discharge tray is the unused sheet fed from the first sheet cassette, on which the image is formed, and the sheet has been set in the manual feed tray by a user, if an instruction to restart duplex printing has been received, the operation control section controls the sheet feeding unit to feed one sheet set in the manual feed tray, and controls the image forming unit to form an image of a second page based on the image data indicated by the duplex printing instruction on the other side of the sheet, and the operation control section controls the sheet feeding unit to feed a sheet from one of the first and second sheet cassettes indicated by the duplex printing instruction, and controls the image forming unit to form images of a third page and subsequent pages based on the image data indicated by the duplex printing instruction on both sides of sheets.

2. The image forming apparatus of claim 1, wherein, when the reception section has received the instruction indicating that the sheet discharged to the discharge tray is the reused sheet fed from the second sheet cassette, on which the image is formed, the operation control section controls the sheet feeding unit to feed a sheet from the one of the first and second sheet cassettes indicated by the duplex printing instruction, and controls the image forming unit to form images of the second page and subsequent pages based on the image data indicated by the duplex printing instruction on one side of the sheets by the image forming unit.

3. The image forming apparatus of claim 1, wherein, when the reception section has received the instruction indicating that the sheet discharged to the discharge tray is the reused sheet fed from the second sheet cassette, on which the image is formed, the operation control section controls the sheet feeding unit to feed a sheet from the first sheet cassette, and controls the image forming unit to form an image based on the image data indicated by the duplex printing instruction on both sides of the sheets.

4. The image forming apparatus of claim 1, wherein, when the reception section has received the instruction indicating that the sheet discharged to the discharge tray is a reused sheet fed from the second sheet cassette, on which the image is formed, the operation control section stops a printing job based on the duplex printing instruction.

5. The image forming apparatus of claim 1, further comprising:
a sheet detection sensor configured to detect a set of sheets in the manual feed tray, wherein
when the duplex printing instruction has been received, if the sheet detection sensor has detected the set of the sheets in the manual feed tray after the sheet conveying unit discharges the sheet with the image of the first page formed on one side thereof to the discharge tray, the reception section receives the detection as the instruction indicating that the sheet discharged to the discharge tray is the unused sheet on which the image is formed and the sheet has been set in the manual feed tray by a user, when the reception section has received the duplex printing instruction, if the instruction to restart duplex printing has been received, the operation control section controls the sheet conveying unit to feed one sheet set in the manual feed tray, and controls the image forming unit to form the image of the second page based on the image data indicated by the duplex printing instruction on the other side of the sheet, and the operation control section controls the sheet feeding unit to feed the sheet from the one of the first and second sheet cassettes indicated by the duplex printing instruction, and controls the image forming unit to form the images of the third page and the subsequent pages based on the image data indicated by the duplex printing instruction on both sides of the sheets.

6. The image forming apparatus of claim 1, further comprising:
a display control section configured to control a display section and a display operation of the display section, wherein
the display control section controls the display section to display a predetermined operating screen after the sheet conveying unit discharges the sheet with the image of the first page formed on one side thereof to the discharge tray,
the reception section, when the duplex printing instruction has been received, is configured to receive the instruction indicating that the sheet discharged to the discharge tray is the unused sheet on which the image is formed and the sheet has been set in the manual feed tray by a user, according to a user operation based on the operating screen displayed by the display section,
when the reception section has received the duplex printing instruction, if the instruction to restart duplex printing has been received, the operation control section controls the sheet conveying unit to feed one sheet set in the manual sheet tray, and controls the image forming unit to form the image of the second page based on the image data indicated by the duplex printing instruction on the other side of the sheet, and
the operation control section controls the sheet feeding unit to feed the sheet from the one of the first and second sheet cassettes indicated by the duplex printing instruction, and controls the image forming unit to form the images of the third page and the subsequent pages based on the image data indicated by the duplex printing instruction on both sides of the sheets.

* * * * *